United States Patent
Albers

(10) Patent No.: US 6,176,784 B1
(45) Date of Patent: *Jan. 23, 2001

(54) CARDAN-TYPE JOINT

(75) Inventor: Hartmut Albers, Stuttgart (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/080,251

(22) Filed: May 18, 1998

(30) Foreign Application Priority Data

May 17, 1997 (DE) ............................. 197 20 857
Jun. 27, 1997 (DE) ............................. 197 27 321

(51) Int. Cl.[7] .................................................. F16D 3/62
(52) U.S. Cl. ................... 464/69; 464/93; 464/137; 464/138; 464/8; 464/56
(58) Field of Search .................... 464/93, 94, 95, 464/55, 69, 87, 137, 85, 92, 98, 99

(56) References Cited

U.S. PATENT DOCUMENTS

| | | | |
|---|---|---|---|
| 703,582 | * 7/1902 | Hicks | 464/56 |
| 903,171 | * 11/1908 | Callan | 464/8 |
| 1,114,326 | * 10/1914 | Allen | 464/56 |
| 1,424,051 | * 7/1922 | Wayne | 464/69 |
| 3,362,252 | * 1/1968 | Ditlinger | 464/137 |
| 3,668,891 | * 6/1972 | Brizzolesi | 464/93 |
| 4,118,952 | 10/1978 | Kobayashi . | |
| 4,182,139 | * 1/1980 | Hornig et al. | 464/93 |
| 4,188,802 | * 2/1980 | Zeidler et al. | 464/93 |
| 4,790,794 | * 12/1988 | Takeda et al. | 464/93 |
| 5,033,988 | * 7/1991 | McGuire et al. | 464/93 |
| 5,540,621 | * 7/1996 | Keester et al. | 464/93 |

FOREIGN PATENT DOCUMENTS

| 408277 | 1/1925 | (DE) . |
|---|---|---|
| 18 05 916 | 12/1957 | (DE) . |

(List continued on next page.)

OTHER PUBLICATIONS

Bussien: Automobiltechnisches Mandbuch, Berlin 14, Auflage, Verlag H. Cram, pp. 352 and 353, 1941.

(List continued on next page.)

Primary Examiner—Lynne H. Browne
Assistant Examiner—Kenneth Thompson
(74) Attorney, Agent, or Firm—Evenson, McKeown, Edwards & Lenahan, P.L.L.C.

(57) ABSTRACT

A cardan-type joint has flanges which are arranged on mutually facing shaft ends and preferably have three axially projecting driving pins, respectively, which are mutually staggered and uniformly arranged on the circumference of a common graduated circle. The driving pins are connected with one another in a torsion-proof manner by a flexible joint ring which is provided in corner points with sockets for the driving pins. The multi-part joint ring is formed by a collar of several oval driving loops. Each of the driving loops winds around two adjacent sockets. In order to easily permit relatively large bending angles during rotation, even in the event of a high mechanical and thermal loading of the cardan-type joint, the oval driving loops are indirectly or directly swivellably disposed on the driving pins by a pair of contact surfaces which are round in a meridian section in an axially slidable manner on the socket or on the driving loop. In this case, as viewed radially from the outside, the contact surface pairs may be made concave or convex. In the case of a convex contact surface shape, a spherical shape is preferred.

17 Claims, 9 Drawing Sheets

FOREIGN PATENT DOCUMENTS

| | | |
|---|---|---|
| 1 040 854 | 10/1958 | (DE) . |
| 2 353 303 | 5/1974 | (DE) . |
| 37 34 089 A1 | 6/1988 | (DE) . |
| 41 40 311 A1 | 6/1993 | (DE) . |
| 43 04 274 C1 | 3/1994 | (DE) . |
| 297 08 814 U1 | 8/1997 | (DE) . |
| 2 410 172 | 6/1979 | (FR) . |
| 51-143158 | 12/1976 | (JP) . |
| 52-85534 | 7/1977 | (JP) . |
| 56-87632 | 12/1979 | (JP) . |
| 57-40135 | 3/1982 | (JP) . |
| 1-106565 * | 4/1989 | (JP) . |
| 2-271112 | 11/1990 | (JP) . |

OTHER PUBLICATIONS

"Taschenbuch für den Maschinenbau", W. Beitz et al., Dubbel, Springer–Verlag, Berlin, 1981, page 313.

European Search Report dated Dec. 3, 1999 for EP Appln. 98 10 8045.

Japanese Office Action mailed Mar.24, 1999, with English translation, for JP Appln. 153575/98.

European Search Report dated Dec. 3, 1999 for EP Appln. 98 10 8044.

Japanese Office Action mailed Mar. 24, 1999, with English translation, for JP Appln. 153574/98.

* cited by examiner

CARDAN-TYPE JOINT

BACKGROUND AND SUMMARY OF THE INVENTION

This application claims the priority of German Application Nos. 197 20 857.6, filed May 17, 1997 and 197 27 321.1, filed Jun. 27, 1997, the disclosures of which are expressly incorporated by reference herein.

The present invention relates to a cardan-type joint for torsion-proof connection of two shafts with one another such as the connection which is known, for example, from German Patent Document DE 43 04 274 C1.

When used in vehicles, cardan-type joints of this type are severely stressed not only mechanically, by torque peaks and by overtensioning joint movements, but also thermally as a result of thermal conduction and heat radiation of very hot parts situated in the vicinity of the joints as well as by a movement-caused heat build-up of the joint components themselves. In the case of plastic parts, the loadability of the materials used is reduced by heating of the components so that thermal stressing of the cardan-type joints is also relevant to their mechanical loadability.

Many known cardan-type joints, and particularly cardan shafts of light-weight constructions, have respective flanges on the ends of the two shafts connected by the joint, which flanges have three driving pins axially projecting in the direction of the cardan-type joint. In this case, six driving pins are arranged in a mutually staggered manner and are uniformly arranged on the circumference of a common graduated circle. The driving pins are connected with one another in a torsion-proof manner by a flexible hexagonal joint ring provided with sockets in its corner points. Between the sockets, the joint ring is itself axially elastically deformable so that the two flanges connected by the joint ring can carry out limited angular movements in any direction during rotation. This angular movement axially undulates the joint ring and twists the legs of the polygon so that, within the scope of the elasticity, bending stresses and torsional stresses corresponding to Hooke's law occur and are superimposed on the torque-caused operational stresses. As a result of this superimpostion of stresses, the strength limit of the materials may be reached. Accordingly, because of the fatigue strength of the cardan-type joints, only limited bending angles can be permitted.

Three driving pins per flange, thus resulting in a total of six driving pins in the cardan-type joint, are not absolutely required. Using only two pins per flange, resulting in a total of four driving pins, is also conceivable. In this case, however, because of the distribution of the circumferential stress on the small number of driving pins, these driving pins are subjected to more stress than when a higher number of driving pins is used. The use of four or more pins per flange, resulting in a total of eight or more driving pins in the cardan-type joint, is also conceivable. In this case, with the rising number of driving pins, the required joint diameter becomes larger and/or the tolerable bending angle becomes smaller. Therefore, three or six driving pins are frequently used as a compromise between stress on the components, on the one hand, and joint size, on the other hand.

German Patent Document DE 41 40 311 A1 shows a hexagonal joint ring made of a fiber reinforced material in the form of a ring disk, in the case of which axial sockets are embedded in the reinforced corner areas. The linear areas between two adjacent corners are formed by a relatively thin web which extends in the plane of the ring disk and is made of several cohesive layers of hardened fiber reinforced material. This web is relatively wide in the radial direction. During bending of the cardan-type joint, these webs are not only bent but also twisted. Although, in the case of relatively low bending stresses, the thin webs can be elastically bent, because the shape of the webs deviates considerably from rotational symmetry, during twisting of the webs, high tensions occur mainly at their interior and exterior edges.

The initially mentioned German Patent Document DE 43 04 274 C1 shows a hexagonal joint ring in which the sockets arranged in the corner areas are connected, in pairs, to one another by oval driving loops which themselves are closed and wound on the outside around two adjacent sockets. Specifically, wide centrally located driving loops and a pair of driving loops situated on an edge side are alternately arranged in the joint ring. The wide driving loop is approximately three times as wide as its radial wall thickness. The two narrow driving loops together are approximately as wide as the driving loop situated in the center. The driving loops are radially swivellable on the sockets so that, as an individual component, the shape of the joint ring can be flexibly changed. For holding all parts of the joint ring together and for preventing the entry of dirt, the parts of the joint ring are embedded in a rubber-elastic mass of low hardness and are completely enclosed. Because the radial wall thickness is relatively small in relation to the axially measured width of the driving loops, the loops offer good prerequisites for absorbing circumferential tension when low excess tensions in the curvatures of the driving loops are present. During bending of this cardan-type joint, the driving loops are tilted and also twisted, in which case high excess tensions occur at different points of the driving loops. During tilting, there is a one-sided edge support of the loop curvature on the socket which results in a concentration of tension at this location. During twisting of the relatively wide driving loops, in a manner similar to that of the webs of the joint disk according to German Patent Document DE 41 40 311 A1, excessive tensions occur at the edges although at a lower level than in the disk according to this document. This type of joint ring, therefore, does not offer good prerequisites for good mobility of the cardan-type joint with a simultaneously high torque load.

It is an object of the invention to improve the cardan-type joint of the above-mentioned type such that, in the event of a high mechanical and thermal stress, relatively large bending angles can easily be permitted during rotation.

This object is achieved in cardan-type joints for torsion-proof connection of two shafts with one another in which the connection is axially and/or angularly movable within certain limits. The joint includes flanges arranged at ends of the two shafts connected by the joint. Three driving pins axially project in the direction of the cardan-type joint on each of the flanges to provide six mutually staggered driving pins uniformly arranged on a circumference of a common graduated circle. A flexible, regular polygon-type, joint ring connects the driving pins with one another in a torsion-proof manner and is provided with sockets at corner points. The joint ring is axially elastically deformable between the sockets and is formed in several parts by a collar of several closed oval driving loops forming individual chain links. Each of the loops winds around two adjacent sockets, and each of the loops can be radially swivelled on the sockets so that a shape of the joint ring can change in a flexible manner.

The oval driving loops are swivellably disposed in an axially slidable manner on the driving pins by pairs of mutually corresponding mutual contact surfaces. These surfaces have circular-arc-shaped contours in a meridian section and are disposed on the sockets and on the driving loops. Accordingly, the driving loops can be swivelled on the sockets while carrying out an axial sliding movement so that, at least on the basis of the axial stroke alone which the driving pins carry out with respect to one another, the driving loops are not elastically deformed and, therefore, to this extent are not subjected to an additional stress. If the sliding surfaces have spherical designs, then even twistings can be isolated from the driving loops.

Further features and advantages of the invention will become clear. In addition, the invention will be described in connection with certain embodiments which are illustrated in the drawings.

DESCRIPTION OF THE PREFERRED EMBODIMENTS

Figure 1:
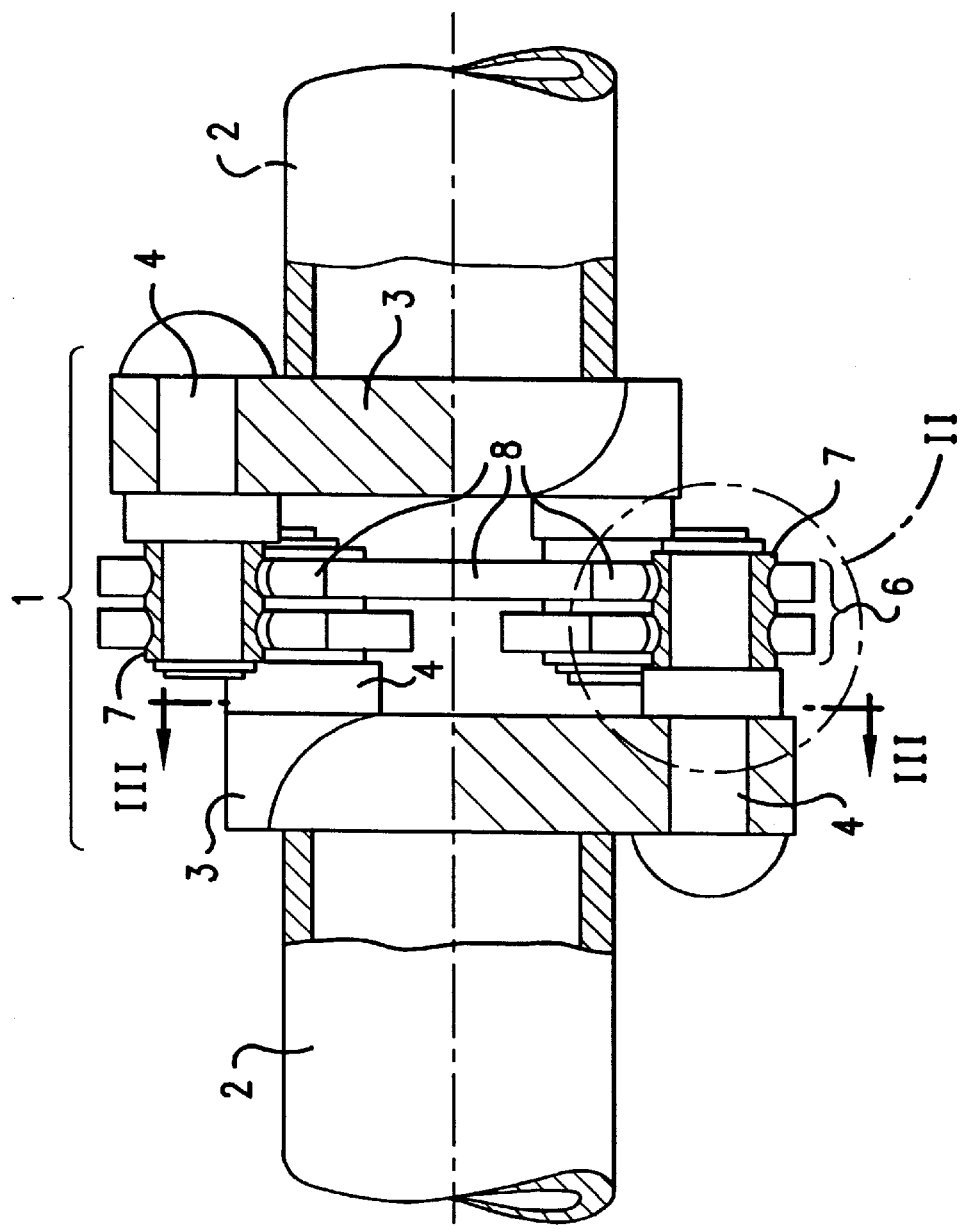
FIG. 1 is a lateral sectional view of a cardan shaft according to the invention.
Figure 2:
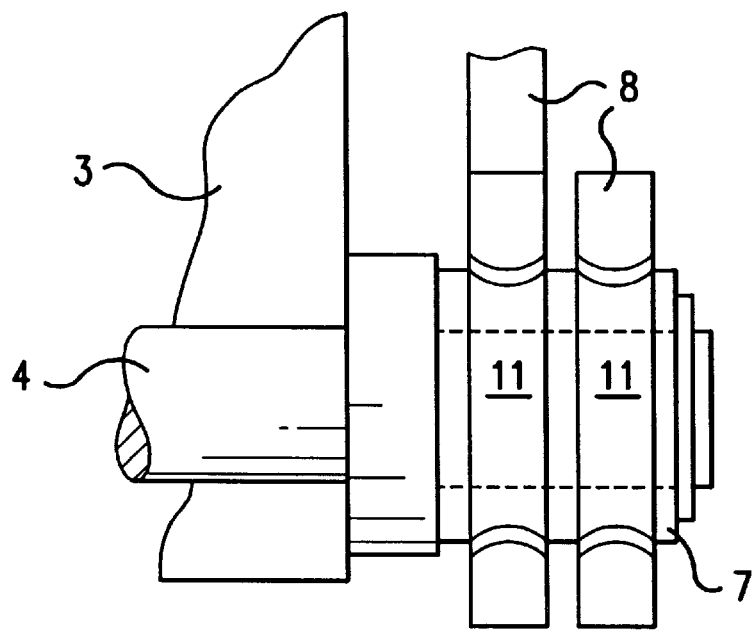
FIG. 2 is an enlarged representation of that portion of the cardan shaft in an area II of FIG. 1.
Figure 3:
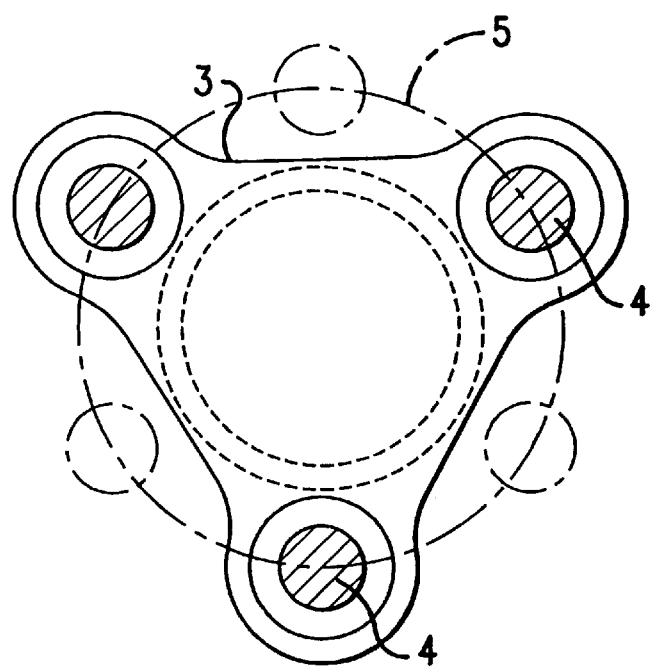
FIG. 3 is an axial view of the shaft flange of the shaft illustrated in FIG. 1 along a section line III—III.
Figure 5:
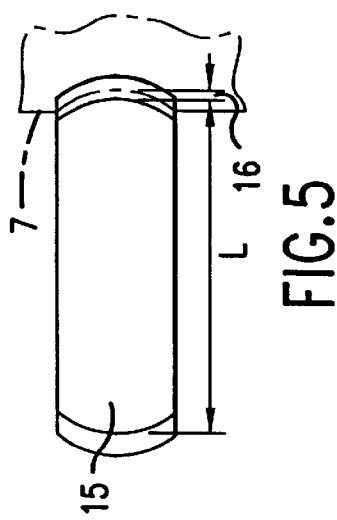
FIG. 5 is a view of the compression bar of FIG. 4 along a section line V—V of FIG. 4.

FIG. 1 illustrates a cardan-type joint 1 by which two shafts 2 can be connected with one another in a torsion-proof manner but in a way such that they are movable within certain limits axially and/or angularly. One flange 3 is arranged at the ends of the two shafts connected by the joint. In the illustrated embodiment, each flange respectively carries three driving pins 4 which project axially in the direction of the cardan-type joint 1. In this case, six driving pins, which are mutually staggered, are uniformly arranged on the circumference of a common graduated circle 5. As is shown more clearly in FIG. 3, the flanges 3 are recessed in the circumferential areas situated between the driving pins; thus, in principle, the flanges have a "star-shaped" construction. Because opposite flanges with mutually staggered arms have this star-shaped construction, during angular movements, the flanges can dip into one another, resulting in a larger angular mobility of the cardan-type joint. The driving pins 4 on the ends of the flange arms are alternately connected with one another in a torsion-proof manner by a flexible, regular polygon-type, preferably hexagonal joint ring 6 which is provided with sockets 7, 7' in its corner points. The legs of the joint ring situated between the sockets can be elastically axially deformed and twisted in one another. The joint ring, in turn, is constructed in several parts and is composed of a collar of several closed oval driving loops 8, 8', 19, 10' and 18, each of which winds around two adjacent sockets 7 and 7 or 7' and 7', respectively, in the manner of individual chain links which can each be radially swivelled on the sockets, so that the shape of the joint ring 6 can be flexibly changed. The individual driving loops, however, are stressed by axial bending and twisting of the individual driving loops, by torque-caused tensile loads, by axial tilting and by twisting. As the result, the overall load which can be tolerated by the cardan-type joint must be set to be correspondingly lower.

In order to be able to easily bend the cardan-type joint relatively extensively in the event of a high mechanical and thermal stress during rotation, without unacceptably impairing the continuous loadability of the cardan-type joint, according to the invention, the driving loops 8, 10, 18 are axially swivellably disposed on the sockets 7, 7'. For this purpose, the oval driving loops, in general terms, are indirectly or directly swivellably disposed on the driving pin 4 because of a pair of contact surfaces, which are round in their meridian sections, while axially sliding on the socket or on the driving loop.

This idea can be implemented in different fashions. In the embodiment illustrated in FIGS. 1 to 6, each circumferential groove 11 which, in its respective cross-section, has a circular-arc-shaped design, is provided on an exterior side of one of the sockets, and a driving loop, which is rounded on its interior side, engages in this circumferential groove. As a result, the driving loops 8 are axially swivellable in the pertaining circumferential groove 11 with an axial sliding movement of the loop cross-section.

During axial swivelling of a driving loop 8 in a circumferential groove 11 of the socket 7, the plane of the driving loop is inclined relative to that of the circumferential groove and the driving loop moves diagonally into the circumferential groove. Although the loops will then still rest without force on the summit of the oval, unless special measures are taken, there will be lateral forced displacements in the areas of the inlet and outlet of the loop into the circumferential groove, which forced displacements, in the case of swinging axial swivellings in which, during each rotation of the cardan-type joint, one complete back-and-forth swinging operation, respectively, is carried out, may result in wear of the driving loops in this area and in premature destruction. This phenomenon is further intensified by an elastic twisting of the driving loop which is the result of the axial swivelling. In order to avoid resulting unacceptably high forced displacements, the circular-arc-shaped boundary contour of the cross-section 9 of the driving loop 8 is continuously changed along its circumference. Specifically, starting from the summit of the oval driving loop with an undisturbed continuous circular arc, the boundary contour of the cross-section 9 is changed toward both flat sides 14 of the oval to form symmetrical pointed arcs 12 with arch flanks having the same radius. Each of the right and left halves of the circular-arc-shaped boundary contour of the cross-section of the driving loop represents a separate toroidal surface, the axis of symmetry or rotation pertaining to the toroidal surface being inclined at an angle with respect to the plane of the driving loop. This angle of inclination corresponds approximately to an orthogonal angle reduced by the swivel angle of the driving loop with respect to its center position. The curvature centers 13, 13', 13" and 13''' of the arc flanks in the various cross-sections 9, 9', 9" and 9''' (FIGS. 6a to 6d), at all points of the oval circumference from one circumferential position to the next with respect to one another, have the same radial distance "a" from the center of the circle of curvature adjacent to the summit of the oval. As can be concluded from the sequence of cross-sectional representations a, b, c and d according to FIG. 6, with an increasing circumferential distance of a circumferential position from the summit of the oval, the pertaining peak of the pointed arc 12 is situated at a radially larger distance from the center of the summit of the circle of curvature. Although it is small, this play between the interior side of the driving loop 8, which, with respect to the swivelling, is to be imagined in the neutral center position, and the circumferential groove 11 in the area of the run-up and run-out positions of the driving loop is necessarily obtained by the above-described shaping of the interior sides of the driving loop. On the other hand, this play, which increases toward the run-up and run-out points of the driving loops, is definitely welcome. The reason for this is that, as a result of the play, torque thrusts acting upon the cardan-type joint, that is, tensile loads abruptly acting upon the driving loops, can be elastically absorbed and tension peaks can be reduced. When loaded, the driving loop will increasingly place itself elastically against the circumferential groove 11 in the wind-around area. Under a maximal load, the above-mentioned radial play will finally be eliminated completely and the driving loop will rest in the whole wound-around circumferential area at least against the tread of the circumferential groove 11.

Figure 4:
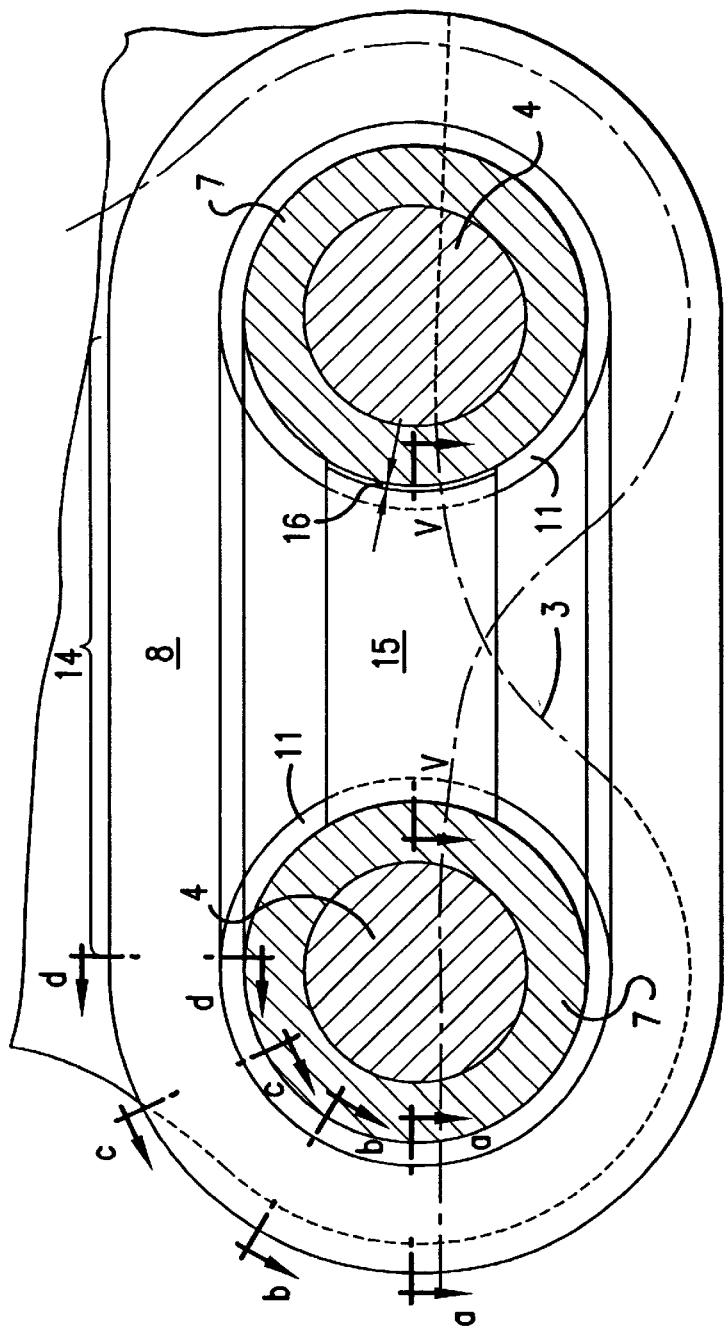
FIG. 4 is an enlarged axial view of a driving loop of the cardan-type joint according to FIG. 1 in the installed condition, including an inserted compression bar.
Figure 6:
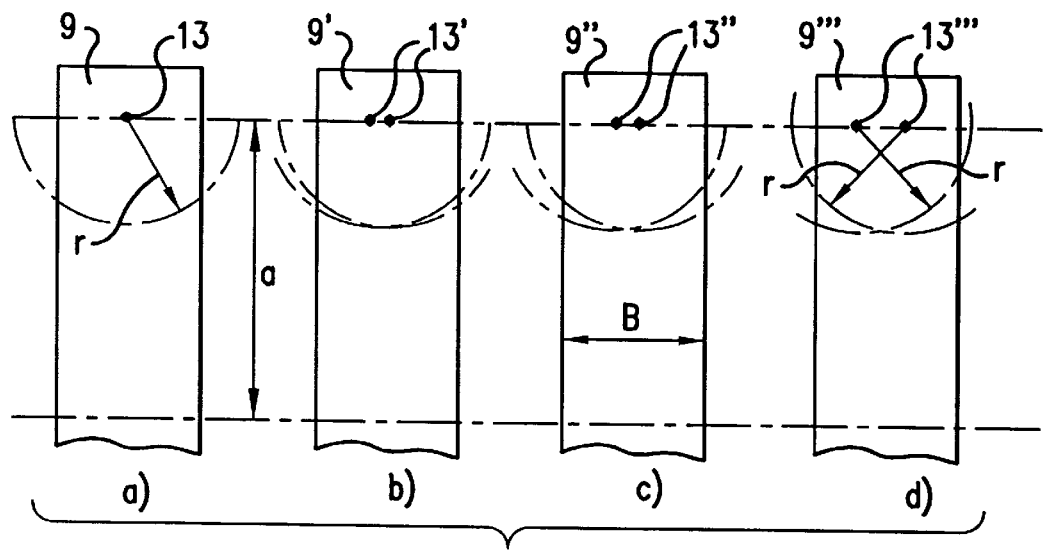
FIGS. 6a to 6d are four individual radial cross-sectional views of the driving loop according to FIG. 4 as seen along section lines a—a, b—b, c—c and d—d, respectively, showing the interior boundary line of the cross-section which changes along the circumference.

In the embodiment of the cardan-type joint and the driving loop 8 illustrated in FIGS. 1 to 6, and as particularly shown in FIG. 4, the interior pointed-arc-shaped boundary contour of the cross-section of the driving loop 8 is constructed to be at least approximately constant along the whole area of the linearly constructed flat sides 14 of the oval. The interior-side pointed-arc-shaped cross-sectional shape of the driving loop at the run-out of one circumferential groove is kept constant to the run-up onto the other circumferential groove. This cross-sectional shape of the flat side 14, which is constant on the interior side for reasons concerning the winding technique of the driving loops, is optimal with respect to manufacturing and also with respect to strength. The reason for this is that the driving loops 8 are optimally formed of an endless-fiber-reinforced synthetic material, in which case a wound individual fiber or a wound endless strand comprising a few individual fibers follows the finished contour of the driving loop 8. In the oval flat sides, the fibers extend also in the area of the interior side in a straight line from one reversing loop to the next. For the same reason, the area of the cross-section of the driving loops is constructed to be approximately constant along its whole circumference, specifically in the area of the circular-arc-shaped contour as well as in the area of the oval flat sides. As far as the cross-sectional shape of the driving loop 8 is concerned, in the illustrated embodiments, it has approximately the same construction in all circumferential positions and is constructed to be approximately square. In the embodiment according to FIGS. 1 to 6 with driving loops which are convex on the interior side and engage in a circumferential groove, it is expedient, in order to provide a compact driving loop construction, to select a cross-sectional shape which can be described by a rectangle with lateral lengths which deviate from one another by no more than approximately 20%. By the compact shape of the cross-section, a compromise is achieved between an optimal band shape of the loop cross-section and a small axial stroke in the sliding surfaces.

It was mentioned above that, during rotation of the cardan-type joint in the bent condition, the driving loops 8 carry out a complete pendulum movement in the axial direction during each rotation, in which case the interior side of the driving loop, which is contoured in a circular arc shape, slides axially in the circumferential groove 11. In order to avoid wear during this sliding movement, particles of a solid lubricant are mixed into the fiber material and/or into the synthetic matrix material of the driving loop 8.

In order to both keep the sliding stroke as small as possible during the above-mentioned pendulum or sliding movement and be able to transmit the force to be transmitted to a surface which is as large as possible (for achieving a low surface pressure), the curvature radius r of the interior boundary contour of the cross-section of the driving loop must not be too small or too large. A flatly curved interior side results in a large sliding stroke and a small curvature radius results in a high surface pressure because there the steeply situated edges contribute almost nothing to the transmission of force. In a usable compromise solution, the curvature radius corresponds to 50 to 150% of the axial width B of the driving loops, and preferably to approximately 65 to 100% of this axial width. In the illustrated embodiment, the radius r corresponds to approximately 75% of the width B.

Figure 7:
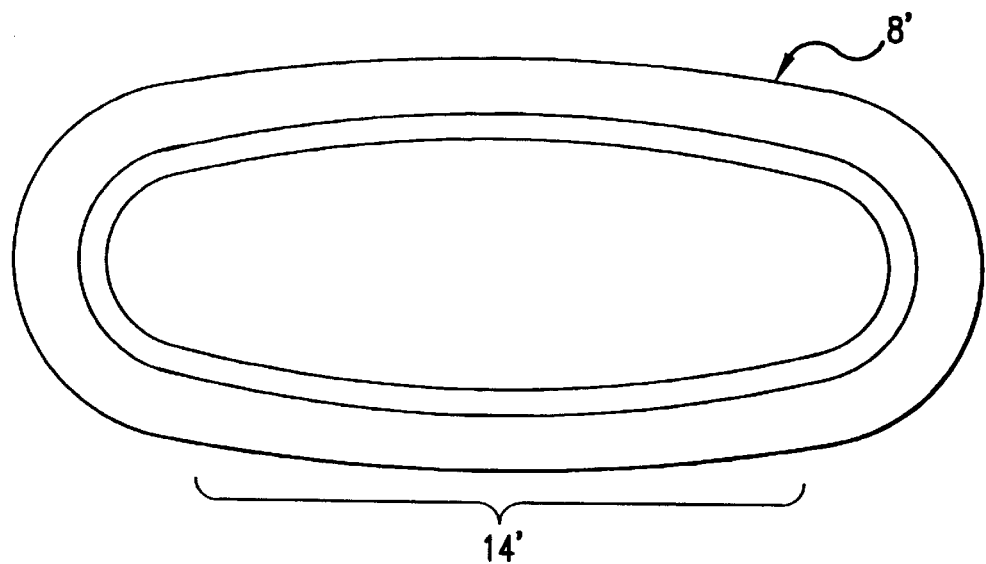
FIG. 7 is an axial view of a modified driving loop with flatter sides of an oval which extend in a curved manner.
Figure 8:
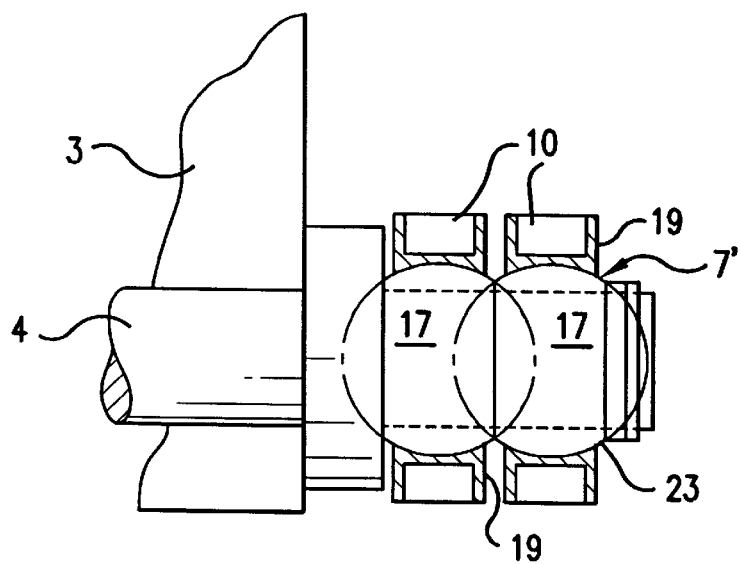
FIG. 8 is an enlarged representation similar to the representation of FIG. 2 but of a modified cardan-type joint with a spherical-surface-shaped elevation on the socket.

In order to optimize the driving loops even more with respect to a thrust-type load, it is expedient, according to the representation in FIG. 7, to construct the flat sides 14' of the oval of the driving loops 8' in a curved manner. As a result, in the event of a tensile load exercised on the driving loop, the curved flat sides can stretch elastically in the direction of a straight line and with respect to time can reduce the tension peak. It is also conceivable to arch the flat sides into the interior of the oval to also cause this effect. However, for better producibility of the driving loops from endless-fiber-reinforced synthetic material using winding techniques, it is more expedient for the curved flat sides 14' of the oval to be curved convexly to the outside.

Both the driving loops 8 and 8' and also the sockets 7 are subjected to a tribological stress. In order to minimize the wear, the sockets 7 are made of a low-friction wear-resistant material, preferably a ceramic material. It may be advantageous in this case for particles of a solid lubricant to be mixed into the ceramic material of the socket.

Although a total of six driving loops 8 are mounted in the cardan-type joint, in any rotating direction, in each case only half the number of driving loops contribute to the torque transmission. In addition, in order to relieve the driving loops, one linear compression bar 15 respectively is mounted in the interior of each driving loop 8 and engages, by way of its faces, in the circumferential groove of the sockets in a force-transmitting manner. For this purpose, the compression bar is provided on its two faces with a saddle surface which is adapted respect to the cross-section as well as with respect to the circumferential course of the circumferential groove of the sockets. The two ends of the compression bar engage in the respective circumferential grooves 11 of adjoining sockets 7. When the cardan-type joint is loaded by the torque in a defined rotating direction, each second driving loop and the three compression bars arranged in the interior of the unloaded driving loops will then participate. By this distribution of the load to a number of force transmitting elements which is twice as high as that present in conventional arrangements, the force transmitting elements in the cardan-type joints will then clearly be relieved.

Under normal load conditions of the cardan-type joint, the three driving loops of one rotating direction alone are easily capable of transmitting the occurring torque so that the compression bars do not normally have to be loaded. In addition, for reasons of static uncertainty, it is possible to uniformly distribute a torque to only three rather than six force transmitting elements of a circle. It is therefore expedient to dimension the length L of the compression bars 15 such that they fill the clear space between the adjacent sockets 7 with play 16 (FIG. 4). As a result, the compression bars have an effect only after a certain load-caused elastic lengthening of the driving loops and will only then also absorb load. Accordingly, the play 16 of the compression bars between two adjacent sockets dimensioned so that it is as large as the load-caused lengthening of the driving loops under a tensile load which, although it is very high, can be tolerated over time. Only when the torque load leads to a higher tensile load on the driving loops and stretches these loops still more are the front ends of the compression bars placed in a force-transmitting manner onto the tread of the circumferential grooves 11 of the sockets.

The compression bars 15 also are formed of a long-fiber-reinforced synthetic material, in which case the long fibers are all situated parallel to one another, parallel to the longitudinal axis of the compression bars, and so that they pass through without any interruptions. Since, during rotation of the cardan-type joint in the bent condition, the compression bars, as well as the driving loops, carry out axial pendulum movements in the circumferential groove by their front ends, it is expedient, for the tribological improvement of this sliding movement, to mix particles of a solid lubricant into the fiber material and/or the synthetic matrix material of the compression bars.

At this point, the embodiment according to FIGS. 14 to 16 will be discussed. This embodiment represents a modification of the cardan-type joint according to FIGS. 1 to 6, and particularly FIG. 4. These two embodiments are similar in that the driving loops 8 and 8"1 are guided on the sockets in circumferential grooves 11 and 11", respectively, which have rounded cross-sections, and in that the driving loops are convexly rounded on the interior sides in the wound-around areas. However, these two embodiments deviate from one another in the manner in which space is created in the circumferential groove for an axial pendulum movement of the driving loop within the circumferential groove which is free of a forced displacement.

A certain disadvantage of the cardan-type ring according to FIG. 4 is that the cross-section of the driving loop 8 in the radial direction is still relatively high so that the optimal flat belt shape for wind-around members is approximated only imperfectly, as illustrated by the sequence of FIGS. 6a to 6d. In the embodiment according to FIGS. 14 to 16, a flatter cross-sectional shape of the driving loop 8" is achieved at least in the area of the flat side of the oval and in the adjacent winding-around area. This shape is, more specifically, an approximately square cross-sectional shape, as best illustrated in FIGS. 16c and 16d.

Figure 16:
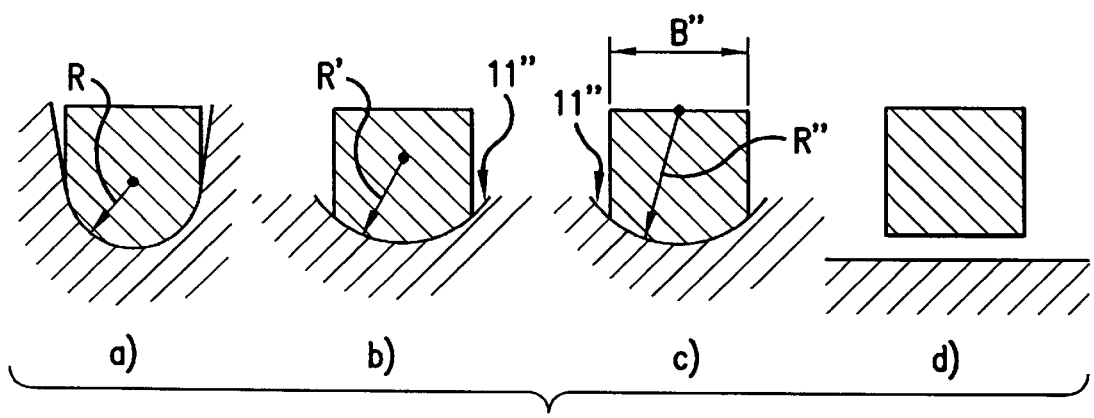
FIG. 16 is a view of a sequence of four individual radial cross-sections of the driving loop and the related receiving groove of the socket according to FIG. 14 as seen along the section lines a—a, b—b, c—c and d—d showing the cross-sections of the driving loops and of the pertaining receiving groove which changes along the circumference of the socket.
Figure 14:
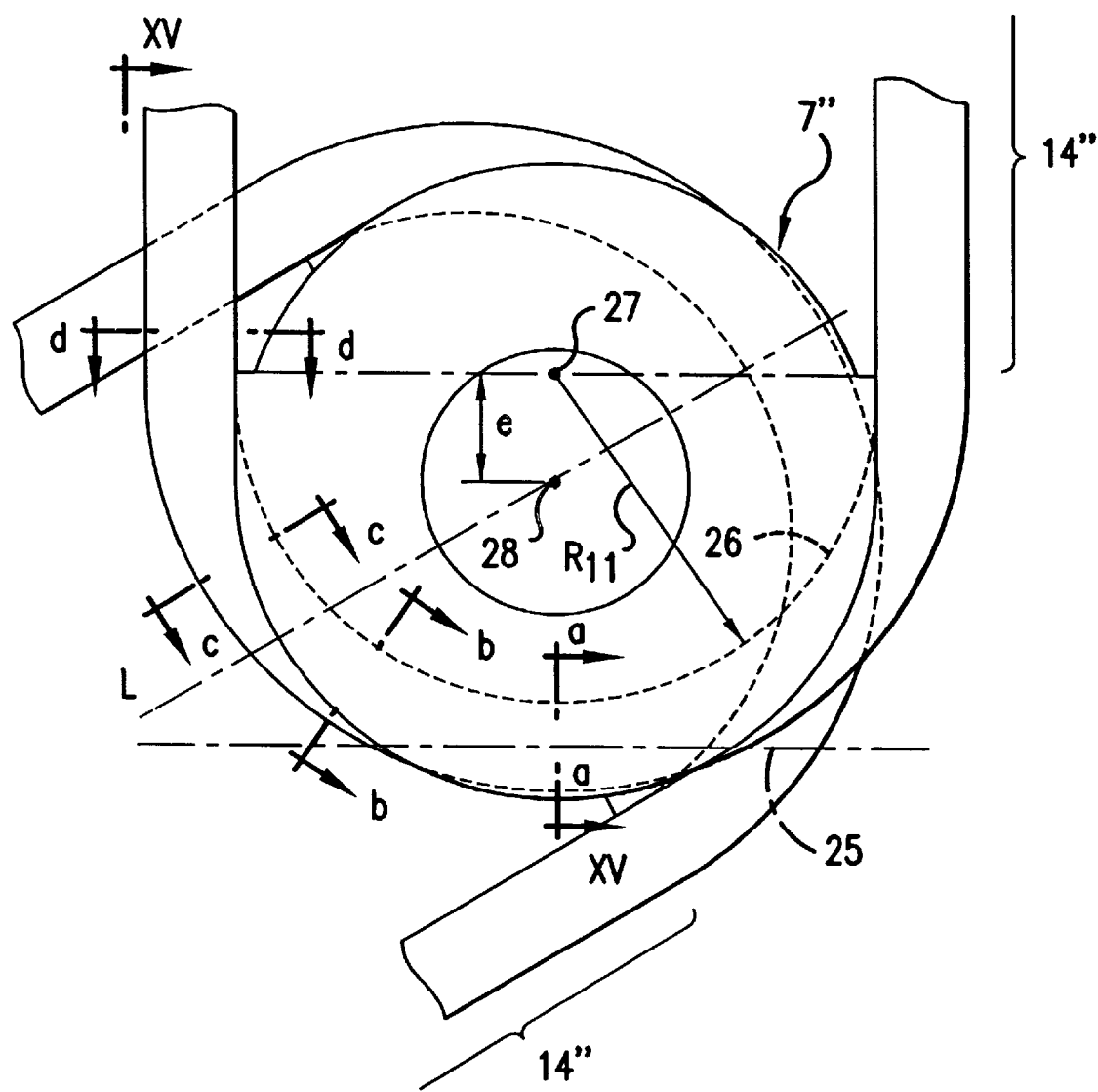
FIG. 14 is an axial view of another embodiment of a socket with driving loops winding around it forming a variant of the embodiment according to FIG. 4.
Figure 15:
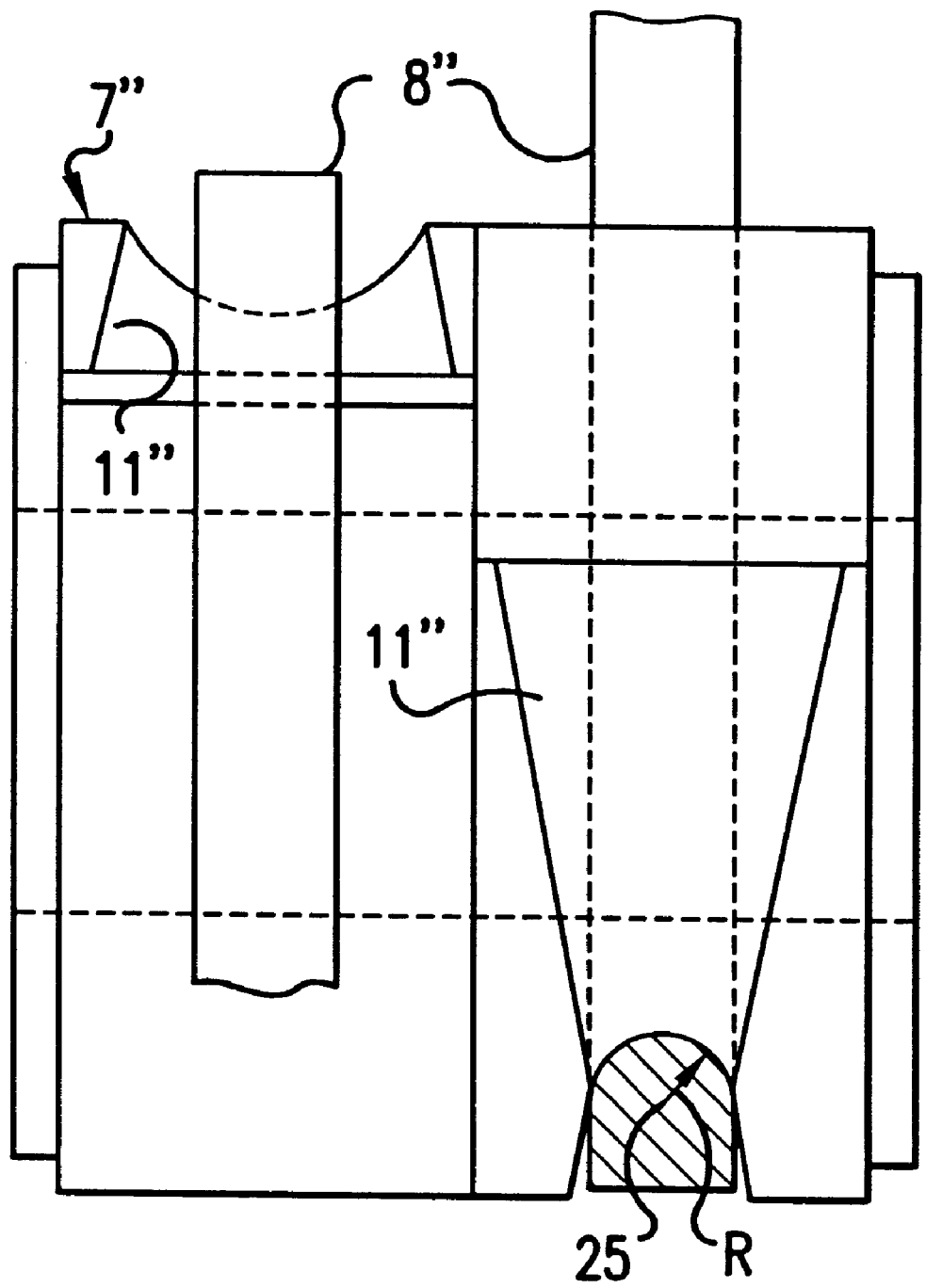
FIG. 15 is a radial view of the socket and the driving loops according to FIG. 14, in which one driving loop in a summit is not shown in a meridian section.

In the embodiment according to FIGS. 14 to 16, the free space within the circumferential groove 11" required for the pendulum movement is created in that the circumferential groove diverges along the wind-around area from the center toward the ends. At the summit of the winding-around (FIG. 16a), the curvature radius R of the groove tread and also of the corresponding cross-sectional contour of the driving loop 8" amounts only to half the axial width B" of the driving loop 8". At the ends of the winding-around toward the flat sides of the oval (FIG. 16d), the cross-sectional contours of the groove tread and of the driving loop 8" are linear and no longer curved. Between these two positions, the curvature changes continuously, and the cross-sectional surface of the driving loop remains constant along the circumference.

Deviating from a shape of the circumferential groove which is rotationally symmetrical with respect to the center 28 of the socket 7", this circumferential groove therefore diverges from the center of the wind-around area toward the flat sides 14" of the oval of the driving loop 8". The groove tread and the cross-section of the driving loop 8" are contoured in the center of the wind-around area in a semi-circular shape with a curvature radius R which corresponds to half the loop width B". The radially interior boundary contour of the cross-section of the circumferential groove 11" and of the driving loop 8" end with a continuously decreasing curvature flatly in the direction of the flat sides 14" of the oval.

The driving loop 8" carries out a pendulum movement relative to the socket in the axial direction about the swivel axis 25 which is dash-dotted in FIG. 14, which swivel axis 25, with respect to its position, corresponds to the radius center of the curvature radius R of the cross-sectional contour according to FIG. 16a (section a—a) of the driving loop 8". Each point of the circumferential groove 11' of the socket 7" is situated on a surface which is rotationally symmetrical to this axis 25. This rotation surface is described by a rotation of the meridian interior line 26, which is indicated in FIG. 14 by a broken line, about the above-mentioned swivel axis 25. The radially interior boundary surface of the circumferential groove 11" and that of the driving loop 8" are essentially formed by a strip from a rotation surface having an axis of rotation, with respect to the position, which coincides with the swivel axis 25 of the driving loop 8" with respect to the socket 7" and having a generatrix which is the semicircular meridian interior line 26 of the circumferential groove 11".

In the illustrated embodiment, the meridian interior line 26 of the circumferential groove 11" is a circular arc with a radius $R_{11}$ about the center 27 which, for reasons of space and stability, is eccentrically arranged by the measurement e in the direction of the driving loop 8" with respect to the center 28 of the socket 7". The center 27 of the semicircular meridian interior line 26 of the circumferential groove 11" is arranged with respect to the center of the socket 7", parallel to the flange sides of the oval and in the direction of its interior eccentrically by the measurement e. The circumferential groove 11" is not constructed to be rotationally symmetrical with respect to the center 28 and arranged on the socket 7". On the contrary, the groove 11" is assigned to a certain circumferential position. Consequently, the socket 7" must be stabilized in its circumferential position in this defined position relative to the driving loops 8". The above-mentioned eccentricity of the curvature center 27 of the circumferential groove 11" and the center 28 of the socket 7" is used also for this purpose. The reason for this is that, because of the eccentricity, the socket 7", after a possible disturbance of the desired position of the driving loop and the socket, due to the pull acting in the driving loop, will automatically always return to the illustrated relative position in which the eccentricity points in the direction of the driving loop.

Other embodiments will now be discussed. First, the embodiment according to FIGS. 8 to 11, in which a circular-arc-shaped contact surface 24, which, viewed from the inside, has a concave cross-section, is provided on a sliding element 19 or 20, while a convex circumferential elevation 17 is mounted on the socket 7'. In the embodiment according to FIGS. 8 to 11, the driving loop is disposed indirectly by sliding elements 19 and 20 on the socket, which provides the advantage that the material of the sliding element can be optimally selected or fixed according tribological aspects. At this point, another advantage of the use of sliding elements should be mentioned. In the case of an arrangement using sliding elements, the contact side between sliding element 19, 20 and the driving loop 10 can have a cylindrical design which is advantageous with respect to manufacturing. The driving loops can then be cut off a wound oval tube.

Joint rings with a convex contact surface shape between the driving loops and the socket corresponding to the embodiments of FIGS. 8 to 11 and FIGS. 12 and 13 have the special advantage of not only permitting non-constrained axial pendulum movements but also of completely avoiding a twisting of the driving loops in the case of a mutual crossing of the adjacent driving pins. For this purpose, it is required that the curvature radius be dimensioned mutually identically in the meridian and in the circumferential direction so that the contact surfaces represent portions of a spherical surface 23, 24. Although the spherical shape of the sliding surfaces causes a relatively large axial stroke during pendulum movements of the driving loops on the circumferential elevations, as a result of a wider contact surface, the surface pressure in the pair of sliding surfaces is reduced simultaneously. Another advantage of the spherical shape and of the wide sliding surface is the fact that the cross-section of the driving loop 10 or 18 can be designed to be wide and flat, which, in the wind-around area, results in a low curvature-caused tension rise toward the exterior positions. The central axial dimension B' of the cross-section of the driving loop 10, 18 can be dimensioned to be larger than its radially measured wall thickness s.

When sliding elements 19 and 20 are used, they are expediently provided on both faces with guiding rims 22 for receiving the driving loop 10 between them which stabilizes the relative position between the sliding element and the driving loop.

Figure 12:
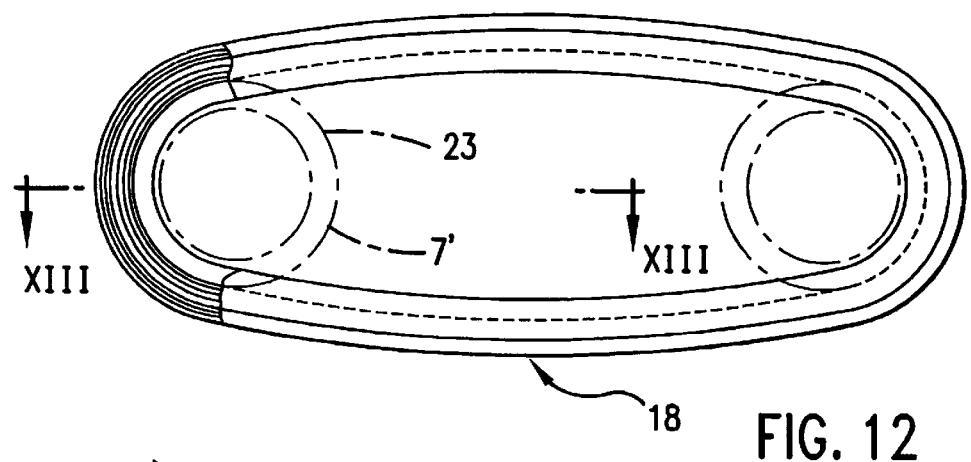
FIGS. 12 and 13 are an axial sectional view (FIG. 12) and a radial sectional view (FIG. 13) of a cross-sectionally curved flat driving loop with curved longitudinal sides of the oval.
Figure 13:
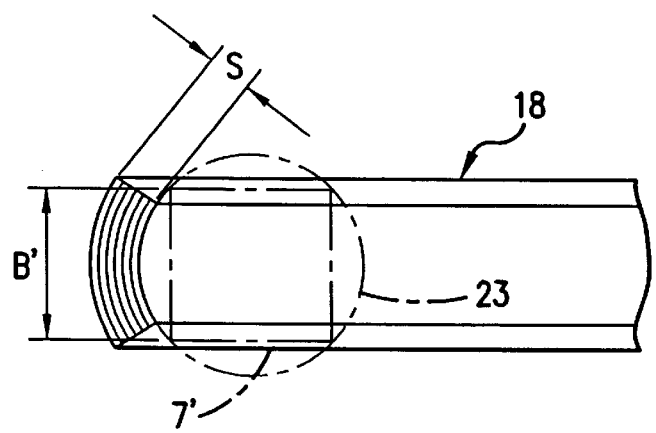

Another advantage of the spherical shape of the contact surfaces is that the spreading effect exercised during a tensile load by the spherical surface on the inserted sliding elements 19, 20 or on the directly supported driving loop 18 according to FIG. 12, 13 is relatively low because the "wedge surfaces" of the ball are situated to be very flatly inclined relative to one another. If they are designed correspondingly, the sliding elements 19, 20 can easily take over this spreading effect. The driving loops, which are fiber-reinforced only in the longitudinal direction, cannot be so highly loaded in the transverse direction and, when resting directly on the spherical surface (FIG. 12 and 13), may, under certain circumstances, be split in the event of an extreme tensile load and a correspondingly high spreading effect. Therefore, if the driving loop 18 slides directly on the circumferential elevation, it is expedient for transverse fibers to be worked into this driving loop 18 for increasing the transverse pull stability.

When spherical contact surfaces are used between the socket and the sliding element or the driving loop, because of the flatter arching of the spherical surface, it is more difficult to center a compression bar 15' in a secure position on the spherical surface, particularly when, as recommended, the compression bar is held with play between the driving pins. Therefore, at least in the case of contact surfaces which are convex to the outside, and particularly spherical, it is expedient to place the compression bars indirectly upon the circumferential elevations 17 by using sliding blocks 19' and 21 made of a slidable material such as a plastic material. On the faces, the compression bars 15' are cut in a linear and rectangular manner to the defined length and, by means of their ends, are fitted into the sliding blocks 19', 21. Together with the compression bars, the sliding blocks form the operating length of the compression bars.

Figure 9:
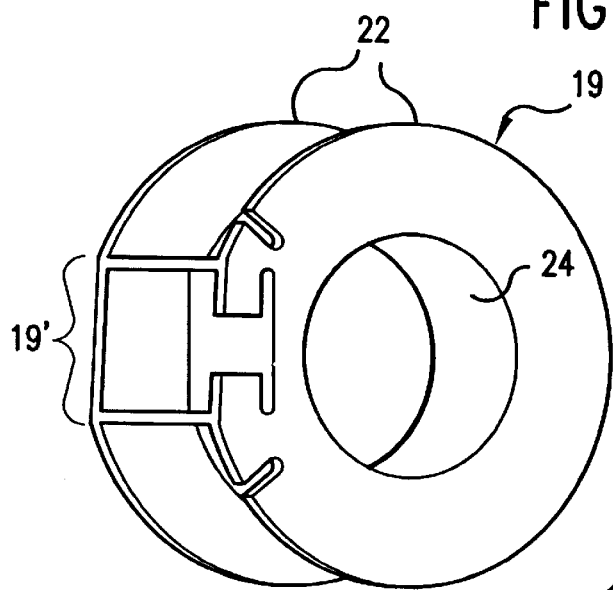
FIG. 9 is an enlarged perspective individual representation of a sliding element with an integrated sliding block for a compression bar for the cardan-type joint according to FIG. 8.

In the embodiment of the sliding element 19 according to FIG. 9, the sliding block 19' for the compression bar 15' is constructionally integrated into the sliding element 19 to form a component which is closed in a ring shape. The driving loop 10 is first placed on the outside onto the two sliding elements in each case between the guiding rims 22 which determines the mutual spacing of the two opposite sliding elements. The sliding elements were expediently previously axially snapped onto the spherical circumferential elevations 17 of the sockets. In order to be able to enter the ends of the compression bar even then still into the sliding blocks, an axially exposed wall of the sliding block has a slotted construction so that, while this wall is elastically bent open, the compression bar end can be axially inserted into the sliding block.

Figure 10:
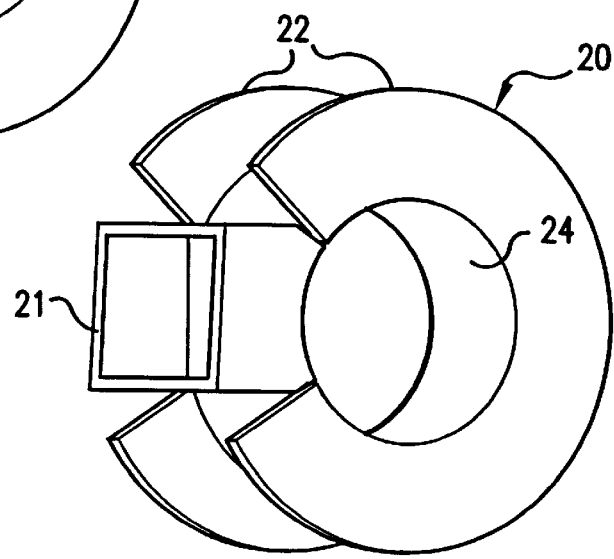
FIG. 10 is a view of a modified form of the sliding element according to FIG. 9, in which the sliding element for the driving loop and the sliding block for the compression bar are constructionally separated from one another.
Figure 11:
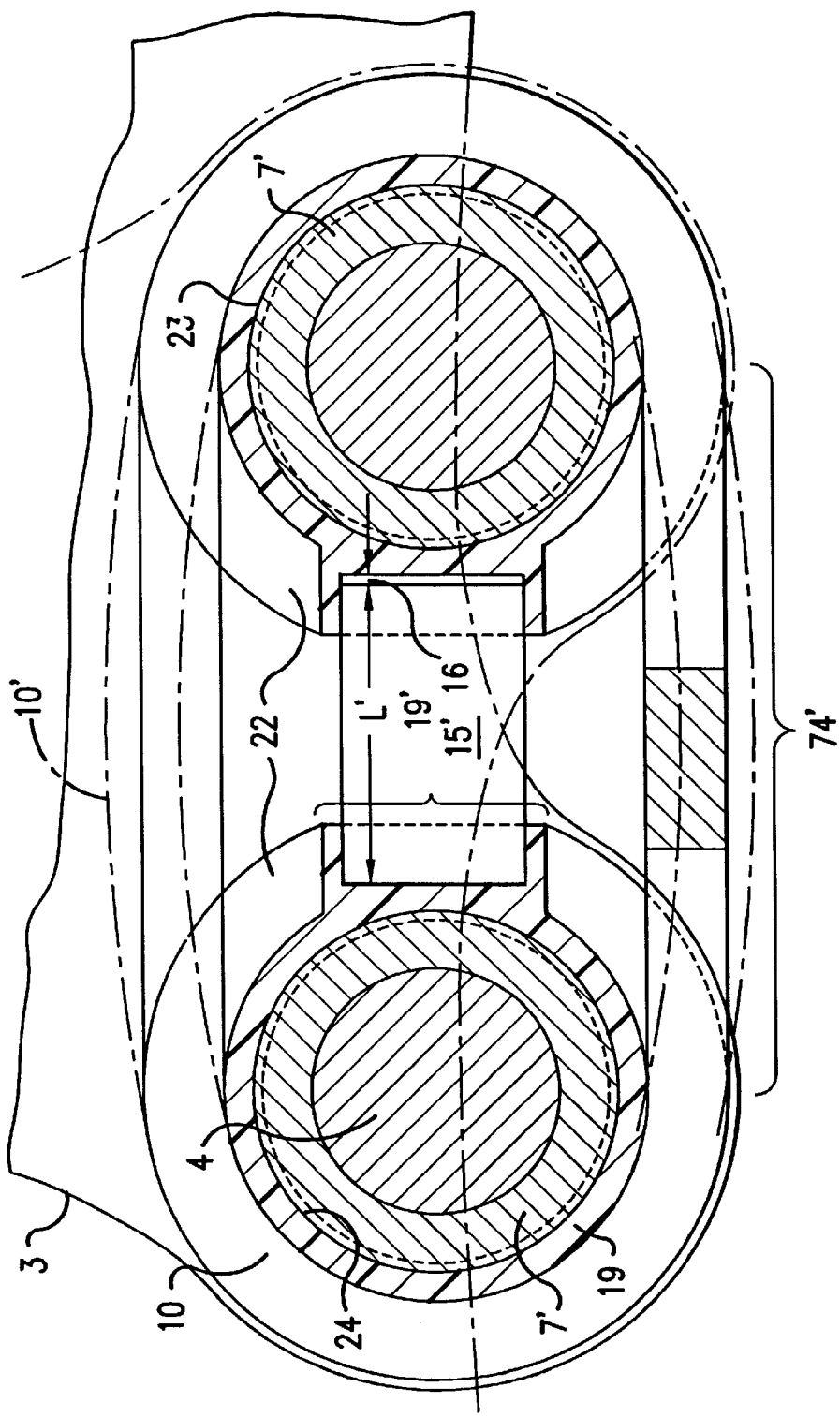
FIG. 11 is a sectional view similar to FIG. 4 but of the cardan-type joint according to FIG. 8 as seen in an axial direction in the installed condition, including the inserted compression bar.

In the case of the further development of the sliding element 20 according to FIG. 10, this sliding element 20 has a C-shaped construction and the sliding block 21 for the compression bar 15' is designed as a separate component with respect to it. The driving loops with the two pertaining sliding elements 20 and sockets, on the one hand, and the compression bar with the two sliding blocks 21, on the other hand, can each be preassembled separately. The preassembled units can then be pushed axially between the circumferential elevations 17 of the socket, in which case the intended play 16 mentioned further above promotes this snap-in operation.

In the embodiments having the spherical circumferential elevations 17 and 23, cross-sectional shapes of the driving loops can be implemented which are very close to the flat-belt shape. In these driving loops, the longitudinal side of each oval may have an arched construction, as indicated by a dash-dotted line in FIG. 11 for the driving loop 10' and as indicated in FIG. 12 for the driving loop 18 in solid lines. By this curvature of the longitudinal sides, a longitudinal elasticity of the driving loop can be achieved. This is the case, however, only if the longitudinal sides have a certain inherent stiffness. If the cross-section of the driving loops is very flat, which is actually desirable, and the geometrical moment of inertia against bending is therefore low, then the spring hardness of the driving loop 10' or 18 against elongation is also low. For implementing a higher elastic hardness of such inherently soft driving loops, it may be expedient to place a filling material of soft rubber or elastic foam in the interior of the driving loops which fills the space between the two curved longitudinal sides of the oval. In the event of a tensile load on the driving loop, this elastic filling material must be compressed by inward-moving longitudinal sides approaching the stretched position. As a result, the elastic resistance of the driving loop to an elongation is increased. Depending on the material-caused and/or shape-caused elastic hardness of the filling material with respect to compressions, a defined elastic hardness of the driving loop can be adjusted.

For protecting the sliding points from entry of dirt and for holding the component parts of the joint ring 6 together to form a workpiece which is closed in itself and can be handled, all parts of the joint ring are embedded in a rubber elastic mass of a low hardness and are completely enclosed by this mass. As an alternative, it is also possible to spray a soft and elastic plastic material around the component parts of the joint ring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cardan-type joint for providing a torsion-proof connection of two shafts with one another which is axially and/or angularly movable within certain limits comprising:

flanges which are, in each case, arranged at ends of the two shafts connected by the joint, three driving pins axially projecting in the direction of the cardan-type joint on each of the flanges to provide six mutually staggered driving pins uniformly arranged on a circumference of a common graduated circle, and a flexible, regular polygon-type, joint ring which connects the driving pins with one another in a torsion-proof manner and which is provided with sockets at corner points, said joint ring being axially elastically deformable between the sockets, the joint ring being formed in several parts by a collar of several closed oval driving loops forming individual chain links, each winding around two adjacent sockets, and each of which can be radially swivelled on the sockets so that a shape of the joint ring can change in a flexible manner, wherein the oval driving loops are swivellably disposed in an axially slidable manner on the driving pins by pairs of mutually corresponding mutual contact surfaces, which have circular-arc-shaped contours in a meridian section, on the sockets and on the driving loops.

2. Cardan-type joint according to claim 1, wherein, at least in the area of contact with the sockets and at least on an interior side facing the socket, each of the oval driving loops is either directly itself contoured in a circular-arc-shaped convex or concave manner or has a sliding element on its interior side which has a circular-arc-shaped contour in its meridian section, the driving loops or the sliding element respectively engaging or reaching over circumferential grooves or circumferential elevations on the exterior sides of the sockets, which circumferential grooves or circumferential elevations are designed, in cross-section, in corresponding arc shapes negatively to the loop-side or sliding-element-side cross-sectional shapes, so that each of the driving loops can be axially swivelled while carrying out an axial sliding movement in one of the circumferential grooves or on one of the circumferential elevations.

3. Cardan-type joint according to claim 2, wherein each of the oval driving loops has a cross-section with a circular-arc-shaped boundary contour and each of the sockets has a circumferential groove, the arc-shaped boundary contour has a convex design in cross-section which is changed continuously along its circumference, starting from a summit of one of the oval driving loops with a circular arc, which continues, in an undisturbed manner, toward two flat sides of the one of the oval driving loops to form symmetrical pointed arcs with arc flanks having radii which are of the same radius.

4. Cardan-type joint according to claim 2, the interior boundary contour of the cross-section of the driving loop is constructed to be at least approximately constantly pointed-arc-shaped along the whole area of linearly constructed flat sides of the oval.

5. Cardan-type joint according to claim 3, wherein the curvature radius of the interior boundary contour of the cross-section of the driving loop corresponds to 50 to 150% of the axial width of the driving loops and, preferably, approximately 80 to 120%.

6. Cardan-type joint according to claim 2, wherein the surface area of the cross-section of the driving loop is constant along its whole circumference including an area of the circular-arc-shaped contouring.

7. Cardan-type joint according to claim 2, wherein the oval driving loops are formed of an endless-fiber-reinforced synthetic material, and further comprising a wound endless strand comprising at least one wound individual fiber which follows the finished contour of the driving loop.

8. Cardan-type joint according to claim 7, and further comprising particles of a solid lubricant mixed into the material of the driving loops.

9. Cardan-type joint according to claim 2, wherein, when one of the driving loops slides in a circumferential groove, its cross-section, in all circumferential positions, can be described by an approximately square rectangle having a side length ratio which is in a range of 10:8 to 8:10.

10. Cardan-type joint according to claim 2, wherein each of the sockets includes a low-friction and wear-resistant ceramic material.

11. Cardan-type joint according to claim 10, and further comprising particles of a solid lubricant mixed into the ceramic material of the socket.

12. Cardan-type joint according to claim 2, and further comprising one linear compression bar mounted within the oval driving loop, said one linear compression bar being provided on its two front ends, at least indirectly, with surfaces shaped so that, with respect to the cross-section as well as with respect to the circumferential course, the surface is adapted to the circumferential groove or the circumferential elevation of the sockets, wherein the compression bar, at both ends, engages in the circumferential groove or reaches over the circumferential elevation of one adjoining socket respectively.

13. Cardan-type joint according to claim 12, wherein the compression bars are formed of synthetic material reinforced by long fibers, the long fibers all extending parallel to one another and to the longitudinal axis of the compression bars and passing through the compression bars without interruptions.

14. Cardan-type joint according to claim 12, and further comprising particles of a solid lubricant mixed into the material of the compression bar.

15. Cardan-type joint according to claim 12, wherein the effective length of the compression bar is dimensioned such that they fill a clear space between two adjacent sockets with play.

16. Cardan-type joint according to claim 15, wherein the play of each compression bar between two adjacent sockets is dimensioned such that, when a torque load is applied onto the cardan-type joint, the sockets are not placed in the tread of the circumferential grooves or the surface of the circumferential elevation of the sockets before the driving loops are already loaded by the torque load to a defined circumferential force and are elastically stretched in the circumferential direction.

17. Cardan-type joint according to claim 1, and further comprising a rubber-elastic mass of a low hardness completely enclosing all parts of said joint ring.

* * * * *